US008300917B2

(12) United States Patent
Borgia et al.

(10) Patent No.: US 8,300,917 B2
(45) Date of Patent: Oct. 30, 2012

(54) REMOTE DEPOSIT CAPTURE FOR THE GAMING INDUSTRY

(75) Inventors: Joseph Borgia, Philadelphia, PA (US); James Christopher Noe, Charlotte, NC (US); Christopher George Klapheke, Charlotte, NC (US)

(73) Assignee: Wells Fargo Bank N.A., Charlotte, NC (US)

( * ) Notice: Subject to any disclaimer, the term of this patent is extended or adjusted under 35 U.S.C. 154(b) by 1117 days.

(21) Appl. No.: 11/947,481

(22) Filed: Nov. 29, 2007

(65) Prior Publication Data
US 2009/0141962 A1    Jun. 4, 2009

(51) Int. Cl.
G06K 9/00    (2006.01)
G07B 17/00    (2006.01)
(52) U.S. Cl. .......................................... 382/139; 705/30
(58) Field of Classification Search .......... 382/137–139; 705/30; 235/379
See application file for complete search history.

(56) References Cited

U.S. PATENT DOCUMENTS

| | | | |
|---|---|---|---|
| 5,444,794 A | 8/1995 | Uhland, Sr. | |
| 5,677,955 A | 10/1997 | Doggett et al. | |
| 6,189,785 B1 | 2/2001 | Lowery | |
| 6,363,164 B1* | 3/2002 | Jones et al. | 382/135 |
| 7,076,458 B2 | 7/2006 | Lawlor et al. | |
| 7,197,173 B2 | 3/2007 | Jones et al. | |
| 7,216,106 B1 | 5/2007 | Buchanan et al. | |
| 7,232,060 B2 | 6/2007 | Ahles et al. | |
| 2002/0152166 A1 | 10/2002 | Dutta et al. | |
| 2002/0152170 A1 | 10/2002 | Dutta et al. | |
| 2003/0051971 A1* | 3/2003 | Weiss | 194/200 |
| 2003/0172030 A1 | 9/2003 | Volgunin | |
| 2004/0159590 A1* | 8/2004 | Mothwurf | 209/551 |
| 2006/0124730 A1* | 6/2006 | Maloney | 235/379 |
| 2008/0076536 A1* | 3/2008 | Shayesteh | 463/25 |

OTHER PUBLICATIONS

SNB Check Capture : SmartClient User's Guide, Nov. 2006. Last accessed Nov. 22, 2006, 21 pages.
Remote Deposit. http://www.commercebank.com/business/commercial/cashmanagement/remotedeposit.asp. Last accessed Oct. 3, 2007, 2 pages.
Bank Allows Customers to Deposit Checks Using Home Scanner http://digg.com/software/bank_allows_customers_to_deposit_checks_using_home_scanner. Last accessed Oct. 4, 2007, 2 pages.
Deposit Checks From Home Using Your Scanner. Posted Jan. 29, 2007. http://technabob.com/blog/2007/01/29/deposit-checks-from-home-using-your-scanner. Last accessed Oct. 4, 2007, 8 pages.

* cited by examiner

*Primary Examiner* — Vu Le
*Assistant Examiner* — Amara Abdi
(74) *Attorney, Agent, or Firm* — Kegler Brown Hill & Ritter; James J. Pingor

(57) ABSTRACT

A remote deposit capture system for distributed processing of check presentation can sense, or be instructed to differentiate, between deposit document types, including checks, cash withdrawals, and casino markets. Thereby, automated recognition and correction features can be selectively applied to an imaged deposit document. Thereby deposit documents that tend to use identical transaction codes, such as the same routing/transit numbers in magnetic ink character recognition (MICR) code line data, can be effectively processed without a high failure rate due to duplicate detection. Yet the advantages of duplicate detection are still leveraged against other deposit types. Alternatively or in addition, duplicate detection can be selected to not depend upon uniqueness of MICR code line data.

25 Claims, 13 Drawing Sheets

REMOTE DEPOSIT CAPTURE FOR THE GAMING INDUSTRY

BACKGROUND

The present invention is generally directed to electronic check processing. More particularly, the present invention is directed to image based processing of electronically presented items, such as bank checks.

Electronic check presentment ("ECP") is the electronic transmission of the contents of an interbank transmittal form known as a cash letter, or an electronic cash letter ("ECL"), as captured from the magnetic ink character recognition (MICR) line on each check, to the drawee bank ahead of the physical arrival of the checks actually in the cash letter. The electronic cash letter consists of a listing of items, i.e., checks drawn on a particular bank, referred to as the "payor bank" For each item, the ECL includes an item sequence number, a routing/transit ("RT") number, an account number and amount. Conventionally, a paper cash letter, including the physical paper items, is sent after the ECL is transmitted, and the paper items are recaptured by the payor bank and reconciled against the ECL. Often, check images are also digitized by the bank of first deposit, particularly, large banks that process a large number of checks, in connection with the reading and sorting of the checks.

Remote Deposit Capture (RDC) service speeds the delivery of check deposits and overcome geographic barriers to consolidating banking relationships, as well as eliminating both the cost and time commitments associated with transporting checks. Remote Deposit Capture automates the process of creating, encoding and settling deposits with use of a desktop check scanner, a personal computer (PC) with an Internet connection, and RDC software, such as Remote Deposit Capture, such as RDC Smart Client™ by Wachovia Corporation, Inc. Checks are imaged with the desktop check scanner. The RDC software provides transaction recognition and correction capabilities as well as balancing of the total dollar amount of the deposit to the total of the scanned checks. The RDC software then facilitates transmittal to the banking institution through a secure Internet connection. An e-mail acknowledgement is returned, confirming receipt of the deposit by the banking institution. Once image quality and account numbers have been verified, the banking institution determines the appropriate clearing channel for each check image, and posts the deposit to the specified account.

The RDC software can perform a number of automated quality control processes. One of these checks is in-line duplicate detection. Due to operator error, document misfeeds or other reasons, it is common that a check will be scanned, more than once. Duplicate detection avoids a common source of an improper deposit by removing these duplicates without the need for user intervention. Generally, duplicate detection depends upon finding more than one instance of the same code imprinted in the form magnetic ink character recognition (MICR). Checks typically include MICR code line data (e.g., a bank routing number, account number and unique check number) that can be used for duplicate detection.

While checks tend to comply with standardized formats that assists in the imaging and recognition process, some industries that could benefit from remote data capture, such as the gaming industry, have a number of different kinds of deposits that vary in what data fields are encoded thereon that complicate automated transaction recognition. For example, casinos also allow gaming debts to be settled with cash withdrawal documents and casino marker documents. Often, cash withdrawal and/or casino marker documents utilize the same MICR code line data on multiple items that cause difficulties with conventional RDC software.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

In accordance with one or more versions and corresponding disclosure thereof, various aspects are described in connection with an apparatus and method for electronic processing of deposit document that is imaged. A deposit type of the imaged deposit document is determined. In particular, the imaged deposit document can be of a type that utilizes a unique financial institution code line per deposit document. The imaged deposit document can otherwise be of a deposit type that utilizes a non-unique financial institution code line per deposit document. Based on this determination, duplicate detection performed in an appropriate manner. Thereby, usage of remote deposit capture can be used in additional industries that use deposit documents that differ from traditional bank checks.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description when considered in conjunction with the drawings and the disclosed versions are intended to include all such aspects and their equivalents.

DETAILED DESCRIPTION

Figure 1:
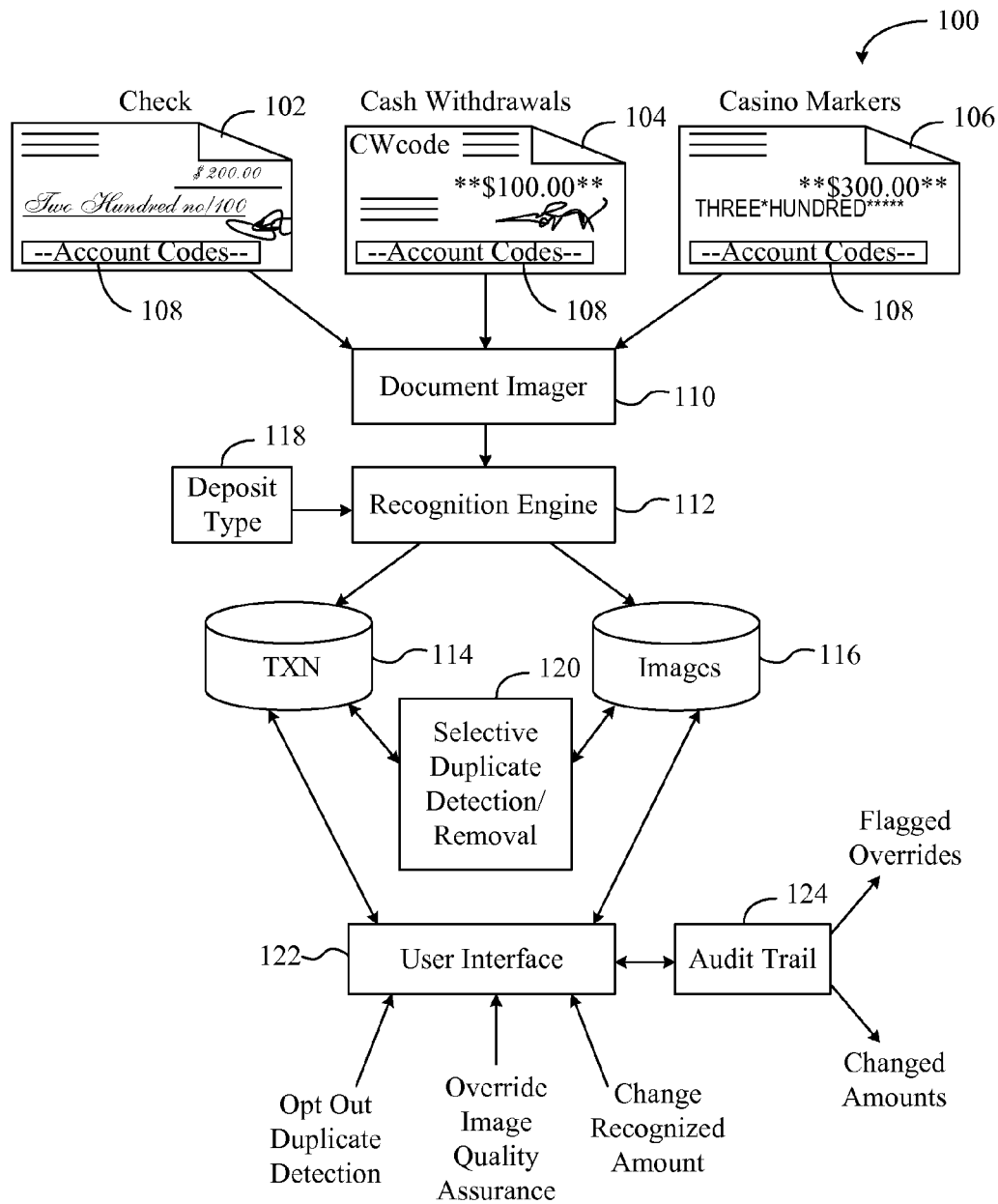
FIG. 1 illustrates a deposit capture system that can perform image recognition on a plurality of types of deposits with selective duplicate detection.

A remote deposit capture system for distributed processing of check presentation can sense, or be instructed to differentiate, between deposit document types, including checks, cash withdrawals, and casino markers. Thereby, automated recognition and correction features can be selectively applied to an imaged deposit document. Thereby deposit documents that tend to use identical transaction codes, such as the same routing/transit numbers in magnetic ink character recognition (MICR) code line data, can be effectively processed without a high failure rate due to duplicate detection. Yet the advantages of duplicate detection are still leveraged against other deposit types. Alternatively or in addition, duplicate detection can be selected to not depend upon uniqueness of MICR code line data.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a deposit capture system 100 that is capable of imaging and recognizing a plurality of deposit document types, depicted as a check 102, a cash withdrawal 104 and a casino marker 106. Each deposit document 102-106 includes a financial institution code line ("account codes") 108. The code line 108 can include a routing number for a banking institution, a user account number, and unique document sequence number (e.g., check number). Often these code lines 108 have the shape of, and perhaps the magnetic properties of, a magnetic ink character recognition (MICR) code line. Typically, the check 102 and cash withdrawal 104 each use a unique code line 108 on each separate document for the ease of the depositor and the deposit receiver to balance their account. The casino marker 106, by contrast, due to the way in which these forms are used, do not have unique code lines 108. The deposit documents 102-106 have other variations in imprinting and writing on them to form a legally binding transaction and to facilitate automated recognition. For example, the deposit documents 102, 104, 106 can include fields that facilitate amount detection (e.g., courtesy amount recognition (CAR), legal amount recognition (LAR), etc.)

A document imager 110 scans in one or more deposit documents 102-106. Each image is passed through a recognition engine 112 that extracts transaction data, stored in transaction database (TXN) 114, associated respectively with images stored in an image database 116. Advantageously, image quality assurance processing and transaction data recognition is made subject to a deposit type component 118. In particular, a duplicate detection/removal component 120 is selectively applied in accordance with the deposit type component 118. A user is afforded an opportunity to opt out of duplicate detection, to override image quality assurance features, and/or to change a recognized deposit amount via a user interface 122, with these inputs tracks by an audit trail component 124.

Figure 2:
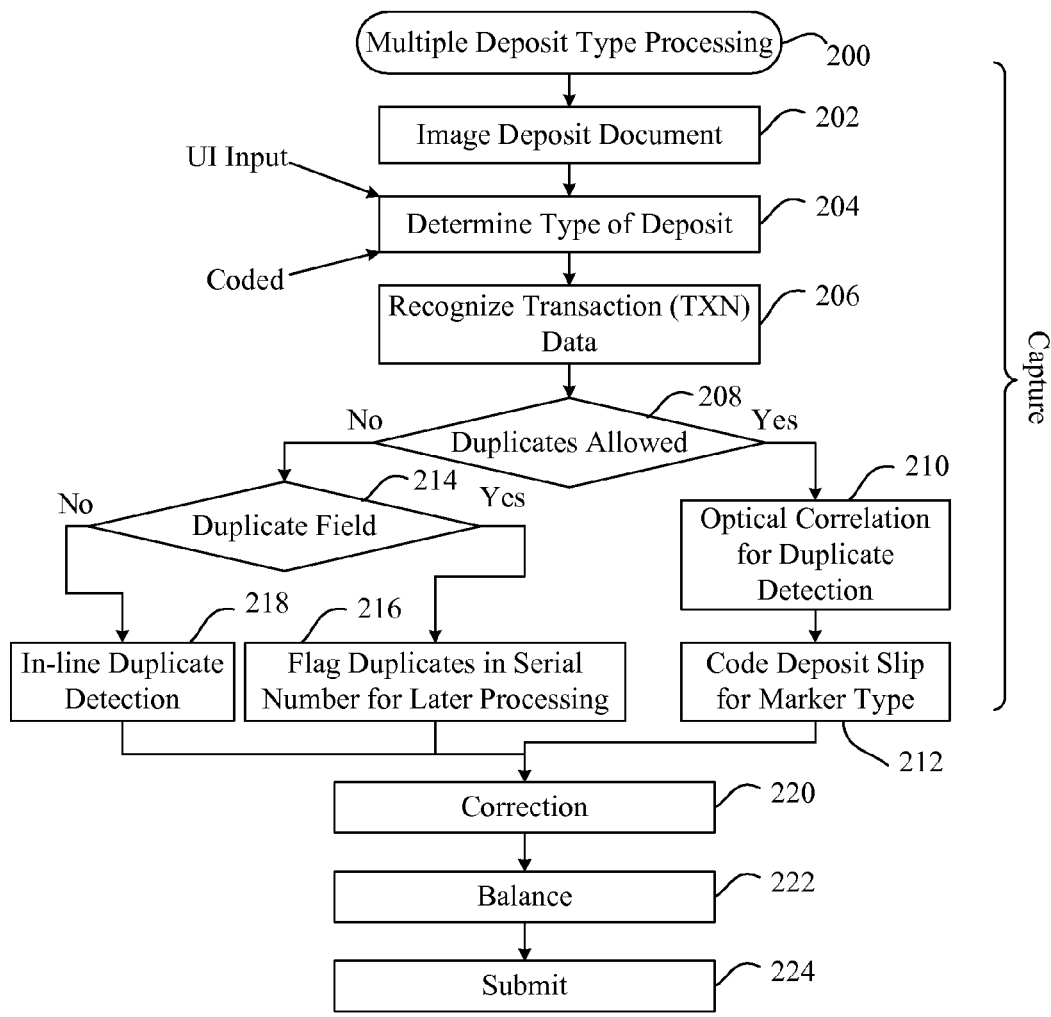
FIG. 2 illustrates a flow diagram of a methodology for performing image recognition on a plurality of types of deposits with selective duplicate detection.

In FIG. 2, a methodology 200 for multiple deposit type processing has a capture portion that begins with imaging deposit documents in block 204. A type of deposit is determined in block 204, which can be based upon a user input via a user interface (UI) and/or a recognized type code included in the deposit document. In accordance with the deposit type, transaction data is recognized in the imaged deposit document in block 206. If duplicate financial institution code lines are allowed for the determined deposit type in block 208, then duplicate detection can be opted out.

Alternatively, as depicted at block 210, for a subset of scanned deposit images that would otherwise be deemed duplicates based on code line, an optical correlation can be made of the potential duplicates with a result compared against a threshold value for determining an identical source document. As a further alternative, a duplicate detection algorithm could identify features and compare feature by feature for correlations (e.g., amount, date, signature image, etc.). Given increasing processing speeds and a subset of such deposits that warrant such additional processing, such enhanced duplicate detection can provide certain advantages to automate duplicate detection even with the relatively easy duplicate detection afforded by unique code lines is not appropriate.

In order to facilitate duplicate detection in accordance with deposit type (e.g., an artificial intelligence (AI) processing and/or a rule-based logic can infer by looking for how similar cases were handled in the past, by reading plain English text on a sample deposit document, assigning statistical analysis based upon the population of deposit documents processed at a particular facility, etc.

The rules-based logic processing can be employed to automate certain functions described or suggested herein. In accordance with this alternate aspect, an implementation scheme (e.g., rule) can be applied to define types of attributes that should be acted upon or ignored, create rules that are aware of characteristics of one or more scanned deposit documents. By way of example, it will be appreciated that the rule-based implementation can automatically define criteria cross-referencing a particular financial institution to narrow the possible deposit types offered by that institution, to interpreting plain English as indicating a particular deposit type, etc.

AI processing can facilitate automating performance of one or more features described herein such as learning what appears to be a particular deposit type by being trained against an assortment of deposit type samples and informed how each should be classified. Thus, employing various AI-based schemes can assist in carrying out various aspects thereof.

A classifier is a function that maps an input attribute vector, x=(x1, x2, x3, x4, xn), to a class label class(x). A classifier can also output a confidence that the input belongs to a class, that is, f(x)=confidence(class(x)). Such classification can employ a probabilistic and/or statistical-based analysis (e.g., factoring into the analysis utilities and costs) to prognose or infer when a recognition of a deposit type is sufficiently assured to allow automatic processing without requiring user intervention.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject invention can employ classifiers that are pre-trained (e.g., via a generic training data from multiple users) as well as methods of reinforcement learning (e.g., via observing user behavior, observing trends, receiving extrinsic information). Thus, the subject invention can be used to automatically learn and perform a number of functions, including but not limited to determining, according to a predetermined criteria.

If duplicate detection is opted out or after the alternative duplicate detection of block 210, then the electronic deposit slip is annotated in block 212 with a code for a type of deposit document (e.g., casino marker) for this captured deposit transaction.

If back at block 208, the type of deposit documents is determined to not allow duplicate financial institution code lines, then in block 214 a further determination is made as to whether it is permissible to flag detected duplicates for downstream removal, affording further flexibility. If so, in block 216 a detected duplicate is flagged in a serial number data field in the transaction data associated with this imaged deposit document. If a duplicate field is not available in block 214, then in-line duplicate detection, perhaps with automatic removal, is performed in block 218.

After blocks 212, 216 or 218, the methodology 200 transitions to a correction phase 220 in which other automated or manually performed processing steps are undertaken. Then the captured and corrected deposits are balanced in block 222. The balanced deposit is submitted to a banking institution for crediting to an account. In addition, the appropriate clearing channels are selected for presenting the deposit document in block 224.

Figure 3:
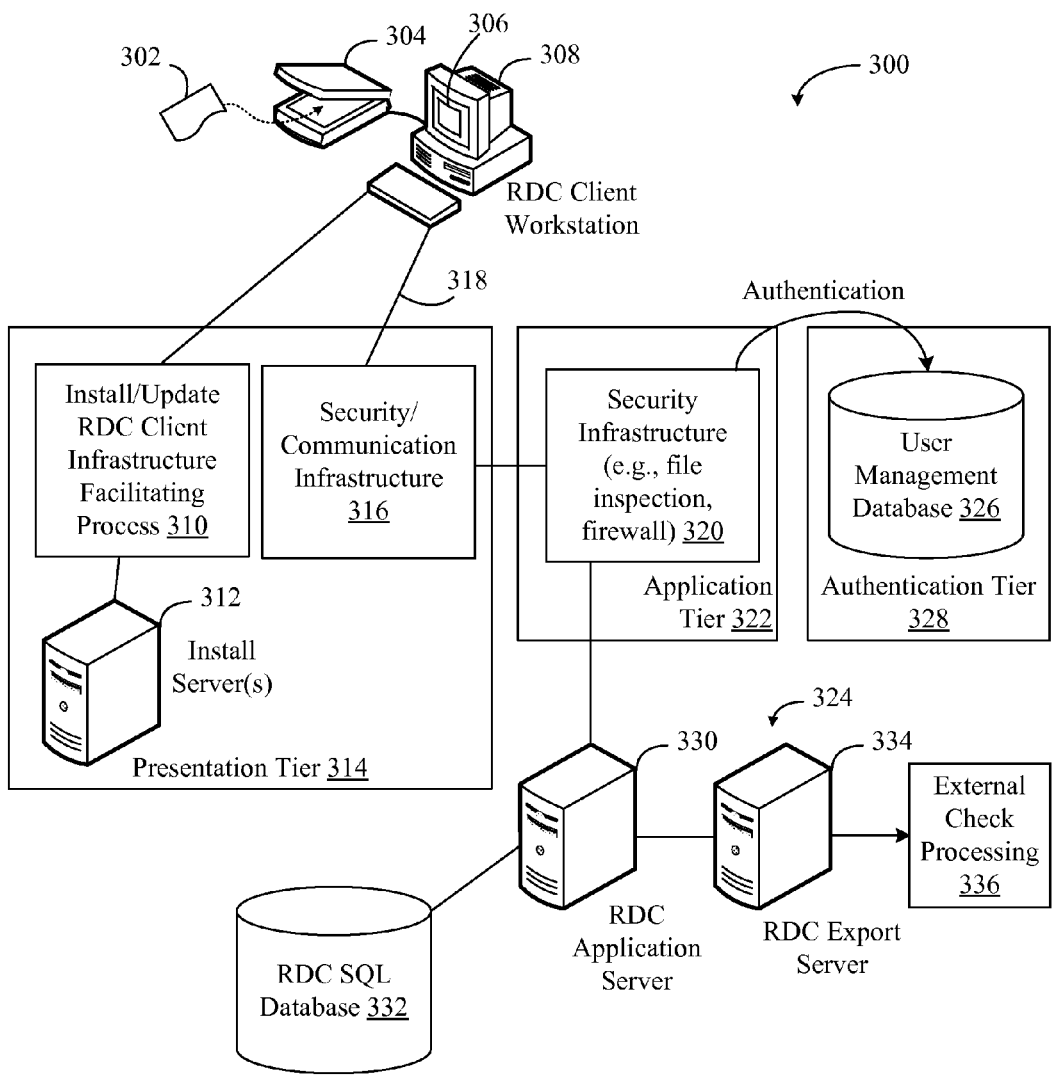
FIG. 3 illustrates a block diagram of a remote data capture system including presentation, application and authentication tiers remotely interfaced to backend processing for account crediting and check clearance.

In FIG. 3, a remote data capture (RDC) system 300 provides for multiple types of deposit documents 302 to be imaged conveniently at a business location, such as a casino gaming business office, on a desktop check scanner or other document scanner 304 with RDC client software 306 performed by a client workstation 308. Initial installation and upgrade of the RDC client software 306 is managed by an install/update RDC infrastructure-facilitating process 310 hosted on installation server(s) 312 of a presentation tier 314 of the RDC system 300. It should be appreciated that each entity of the RDC system 300 can be remotely located with communication made across a private and/or public network 316. The presentation tier 314 also provides security/communication infrastructure 318 for receiving the electronic deposit submissions from the RDC client workstation 308 that are routed through a security infrastructure (e.g., file inspection, firewall etc.) 320 of an application tier 322 to an RDC backend system 324. The electronic deposit submissions are also authenticated against a user management database 326 of an authentication tier 328. The RDC backend system 324 includes an RDC application server 330 that receives the submission and stores the data in an RDC SQL database 332. The RDC application server 330 sends the email acknowledgement back to the RDC client workstation 308. The image quality is verified and an appropriate clearing channel is determined for each deposit document, depicted as an RDC export server 334 in communication with an external check processing system 336.

Figure 4:
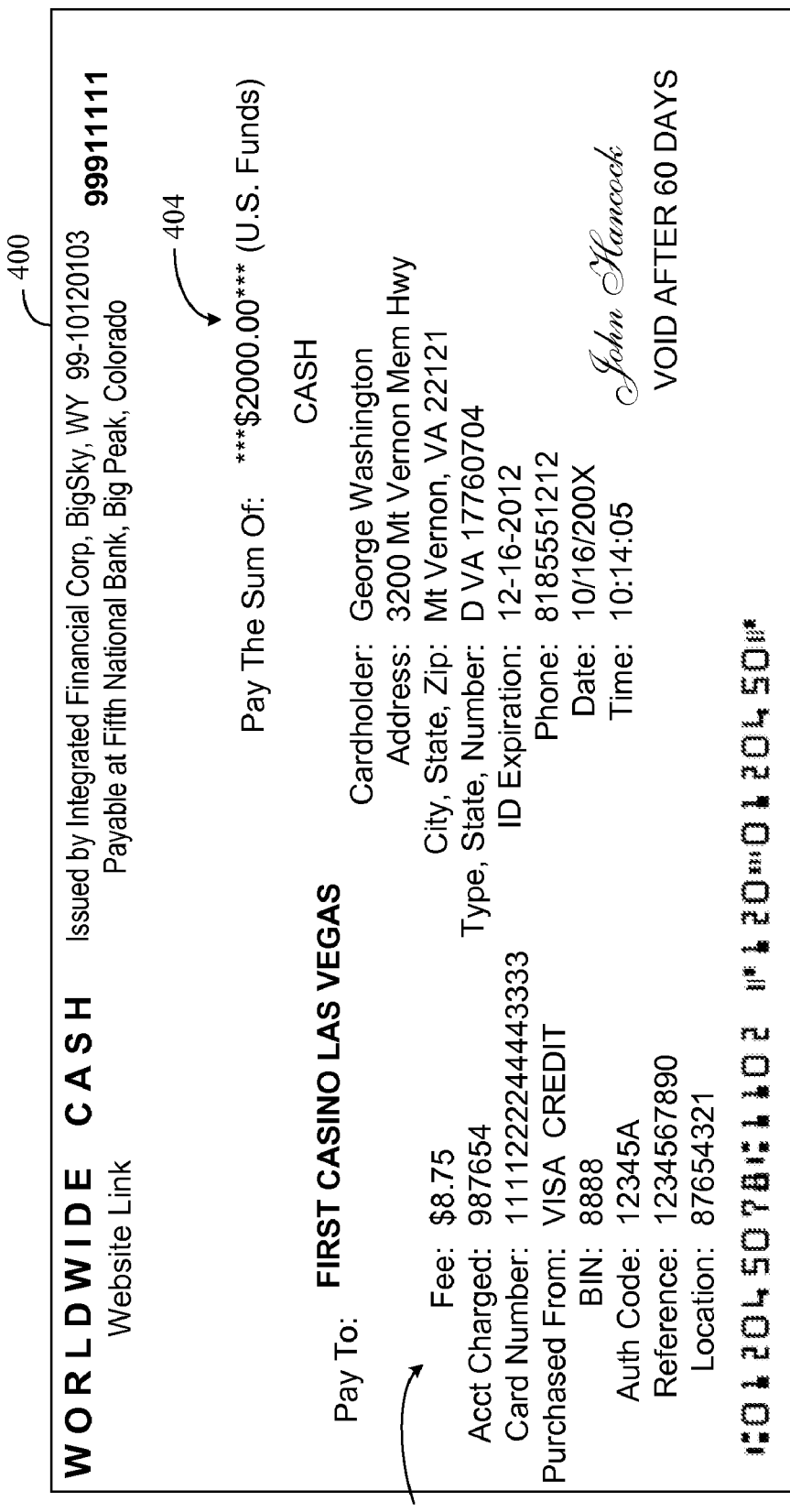
FIG. 4 illustrates a cash withdrawal document processed by the remote data capture system of FIG. 3.

In FIG. 4, an example of a cash withdrawal document 400 processed by the RDC system 300 of FIG. 3. The cash withdrawal document 400 includes unique financial institution code line data, depicted as MICR code line 402 containing routing, a unique document sequence number, and account information. Some printing can facilitate automatic recognition, such a CAR 404 tagged with asterisks and a dollar symbol ("S"). This type of deposit lacks a LAR, but has considerable transaction data for which a defined template or plain text recognition capability can use to recognize additional TXN data fields.

Figure 5:
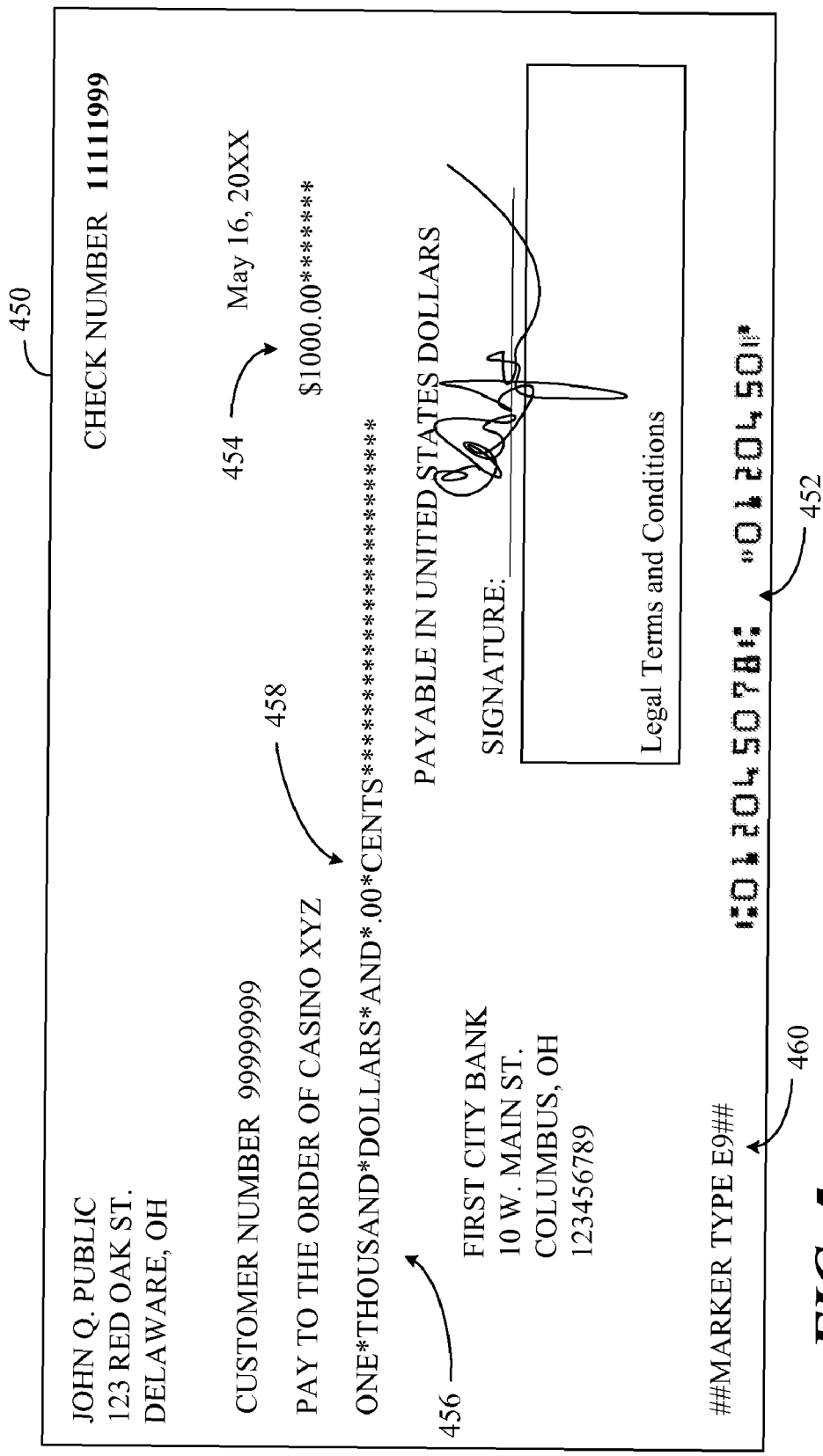
FIG. 5 illustrates a casino marker document processed by the remote data capture system of FIG. 3.

In FIG. 5, by contrast, an example of a casino marker 450 is processed by the RDC system 300 of FIG. 3. The marker 450 includes non-unique financial institution code line data, depicted as MICR code line 452 containing routing and account information that is often replicated on other markers 450. Some printing can facilitate automatic recognition, such a CAR 454 tagged with asterisks and a dollar symbol ("S"). The marker 450 also contains transaction data 456 for which a defined template or plain text recognition capability can use to recognize additional TXN data fields. The transaction data 456 of the marker 450 also includes a LAR 458. The type of deposit document can be automatically recognized, such as by a predefined field, depicted at 460 wherein pound symbols "##" bracket a deposit type (e.g., "MARKER TYPE E9"). Thus, the applicability of duplicate detection can be automatically determined.

Figure 6:
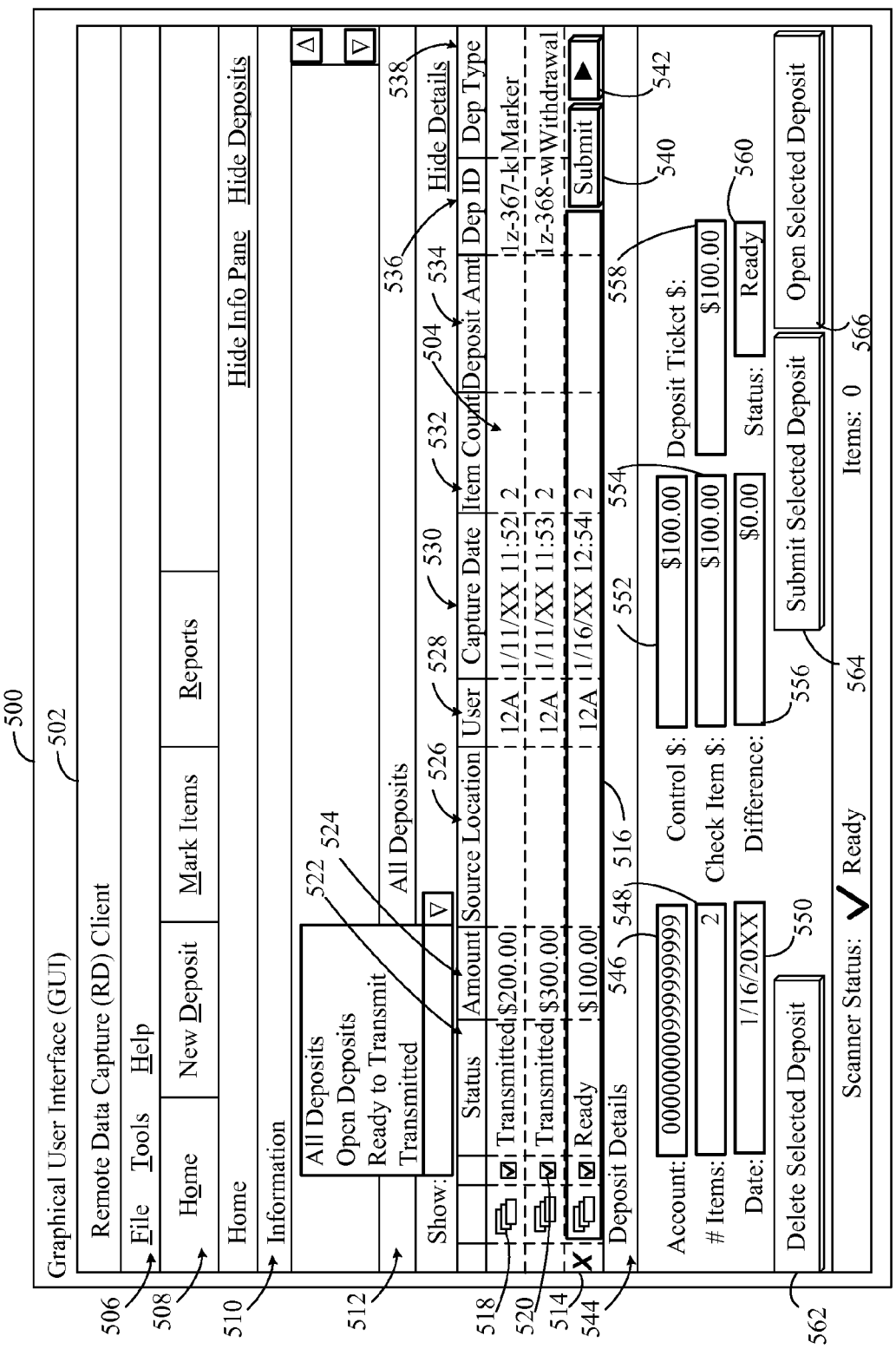
FIG. 6 illustrates a graphical user interface (UI) of the remote data capture system of FIG. 3 depicting a home view window.

In FIGS. 6-10, user interaction with the RDC client software 306 of FIG. 3 is illustrated by a sequence of depictions rendered in a graphical user interface (GUI) 500 that would be presented on the RDC client workstation 308 (FIG. 3). With particular reference to FIG. 6, upon logging in, an RDC home view window 502 is depicted for the user, which in an illustrative aspect presents active deposit records 504 for the current day. A main menu 506 provides a "File" menu having a "Home" function to navigate to the RDC home view, a "New Deposit" function to open a Create New Deposit window (FIG. 7), and an "Exit" function to exit the RDC application. A "Tools" menu has a "Mark Items" function that opens a Mark Items window, a "Reports" function that navigates to a Merchant Reports view, a "Scanner Information" function that opens a scanner information window, and a "Register" function opens a register merchant client window for scanner registration. A "Help" menu has a "Contents" function that display an RDC user guide and has an "About" function that displays an RDC software information window.

The RDC home view window 502 has a toolbar 508 with "Home", "New Deposit", "Mark Items" and "Reports" buttons. An information pane 510 can depict trademark/service mark data associated with the remote data capture service.

A deposits pane 512 shows all deposits that are open deposits, ready for transmit, or transmitted. An "X" button 514 (column 1) by the selected deposit 516 deletes the deposit 516. An icon 518 indicates images available for deposit (column 2). A check box 520 (column 3) indicates deposit submission availability (for use with multiple deposit transmission). A status column 522 shows a status of deposit (e.g., Capture, Correct, Balance, Ready, Transmitted, etc.). An Amount Total column 524 provides a total deposit amount. A source location column 526 provides deposit origination location. A user column 528 specifies a user that created the deposit. A capture date column 530 provides the date and time of deposit item capture. An item count column 532 provides a number of items captured for deposit. A deposit amount column 534 provides an amount of total deposit. A deposit ID column 536 provides a deposit ID for tracking purposes. A deposit type column 538 specifies a recognized or user specified deposit type for the deposit.

A submit button 540 by the selected deposit 516 submits/transmits the deposit. A next button 542 opens the deposit to a status view: Capture, Correct, Balance, discussed below respectively with regard to FIGS. 8-10.

A deposit details pane 544 includes details for the selected deposit 516. An account data field 546 provides an account number to which the deposit will be made. A number of items data field 548 provides a number of items in the deposit. A date data field 550 provides a date of initial deposit creation. A control amount data field 552 provides a total deposit amount for balance check. A check item amount data field 554 provides item amounts totaled. A difference data field 556 provides a balance of control amount data field 552 and check item amount data field 554. A deposit ticket amount data field 558 provides a total on deposit ticket created from image captures. A status data field 560 provides a status of the deposit (e.g., Capture, Balance, Ready, Transmitted, etc.).

A delete selected deposit button 562 deletes the selected deposit 516 from deposit pane 512. A submit selected deposit button 564 submits all deposits checked and ready. An open selected deposit button 566 opens the selected deposit listed in the deposit details pane 544.

Figure 7:
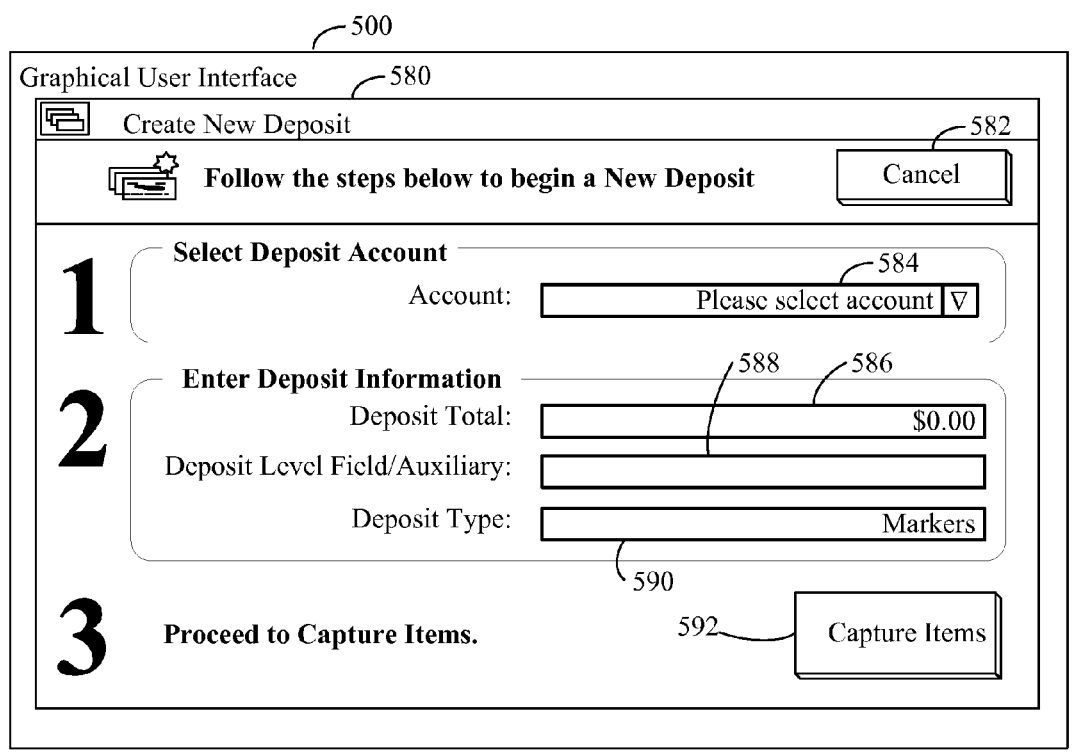
FIG. 7 illustrates a Create New Deposit window with user selected deposit type depicted on the GUI.

With particular reference to FIG. 7, a Create New Deposit window 580 is used to create a new virtual deposit and is selected from the main menu 504 or toolbar 506 of the RDC home view window 502. A cancel button 582 closes the window 580 without any change. A select deposit account dropdown 584 allows selecting the appropriate deposit account, which could be one or more accounts. An enter deposit information area includes a deposit control total entry box 586 that is used for balancing the deposit before transmitting. A deposit level custom field and/or customer auxiliary entry field 588 allows population a serial field (e.g., "AuxOnUs") such as for using with image exchange. Advantageously, a deposit type drop down 590 allows selection of the type of deposit being completed (e.g., marker, withdrawal, check, default, etc.). Then, selecting the capture items button 592 opens a deposit wizard to display deposit and item details as well as other necessary tools and information needed for deposit creation, correction, completion, and transmission processes.

The wizard consists of three views: a Capture view 600 (FIG. 8) that displays the individual images and deposit item details as they are scanned, a Correct view 602 (FIG. 9) that shows each image individually for review and correction, replacement or removal; and a Balance view 604 (FIG. 10) that prompt the balancing of the deposit and subsequent processing of a deposit ticket and transmittal. Each of the deposit wizard views 600-604 contains three panes: deposit details pane 606, an image viewer pane 608, and item details pane 610. The deposit details pane 606 remains the same in each of the views 600-604, unless modified, but the image viewer pane 608 and item details pane 610 change to accommodate the necessary image or tools for that view. At any point during the deposit process, the deposit can be saved and closed by clicking a home button 611, the Home function of the main menu 506 or the Home icon of the toolbar 508 in the Remote Deposit Capture toolbar. When the deposit is opened again, the deposit wizard checks the deposit status and opens to the appropriate view 600-604.

Figure 8:
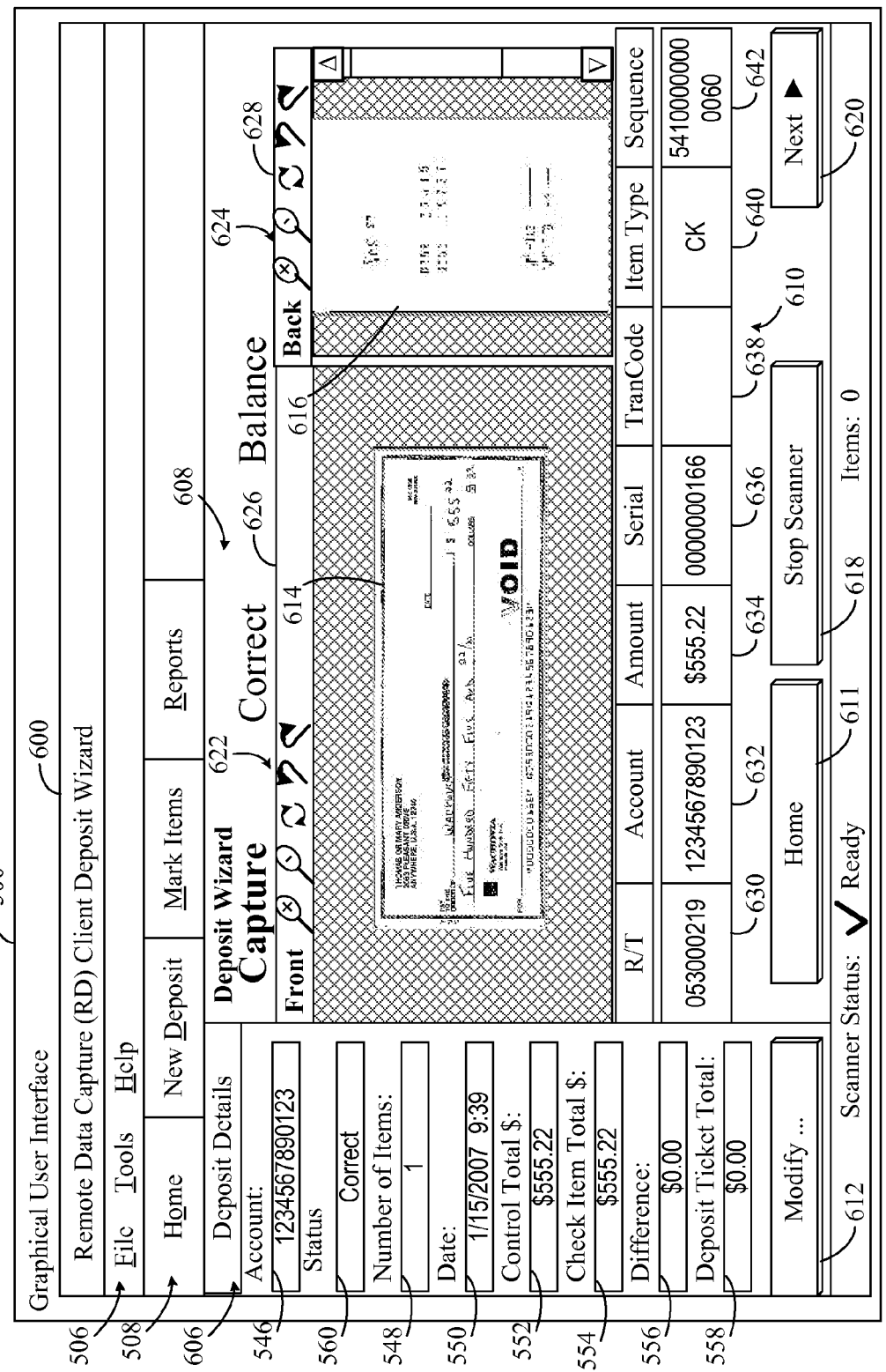
FIG. 8 illustrates a Capture deposit view window presented by the GUI.
Figure 9:
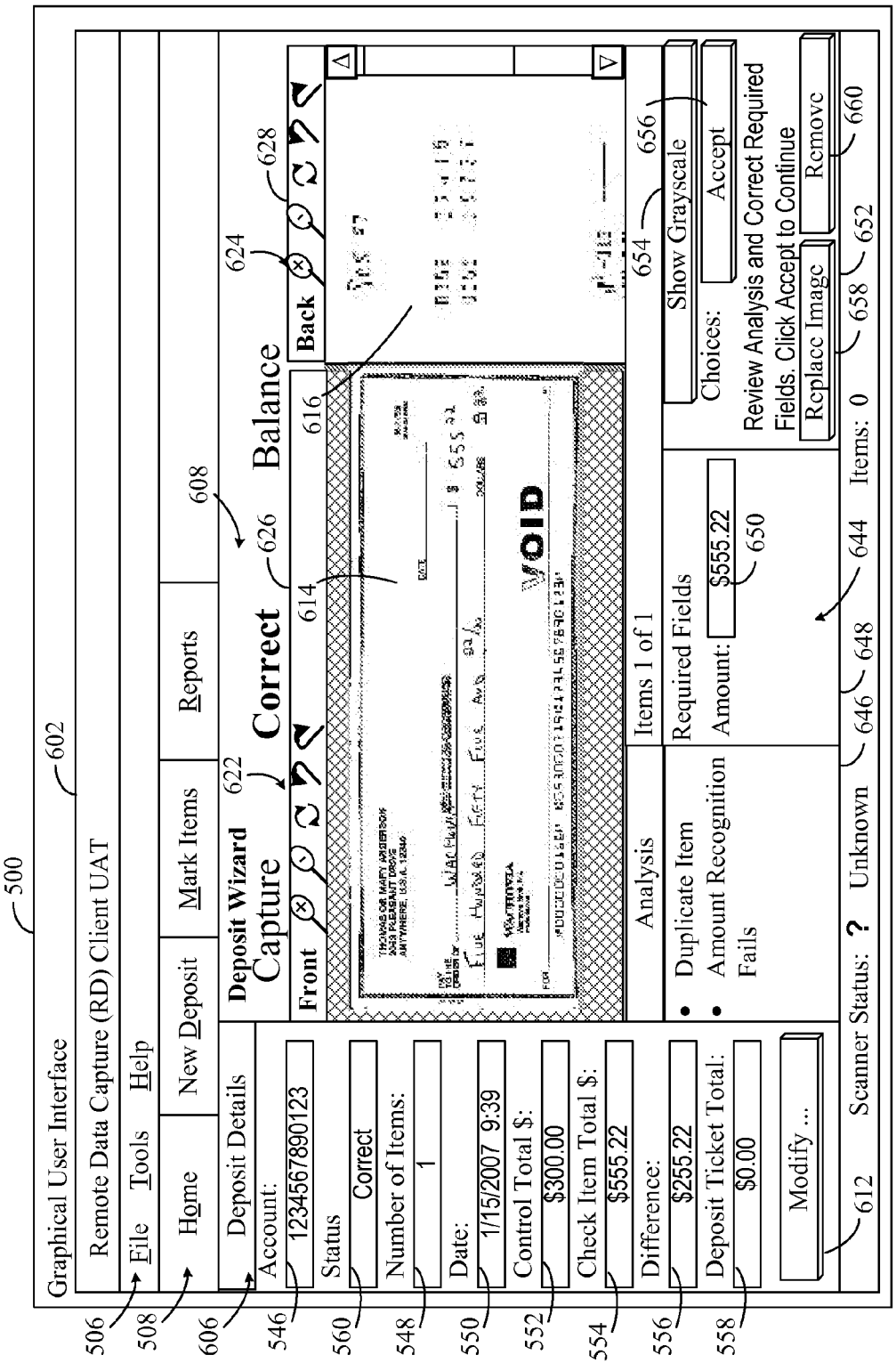
FIG. 9 illustrates a correct deposit view window presented by the GUI.
Figure 10:
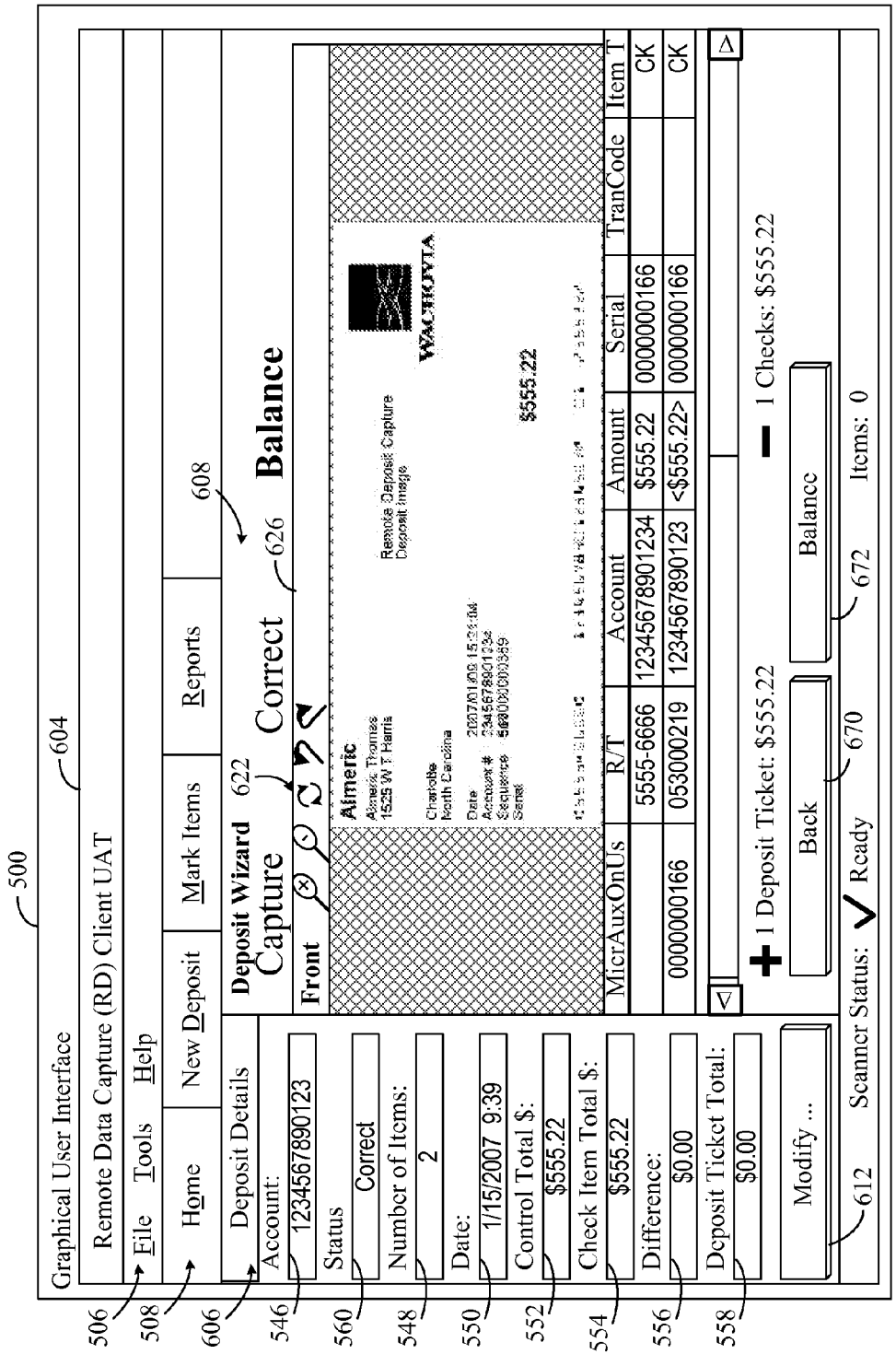
FIG. 10 illustrates a Balance deposits view window presented by the GUI.

In FIGS. 8-10, the deposit details pane 606 includes the fields 546-558 that are also provided on the home view 502 of FIG. 6. In addition, a modify button 612 that can be use modify the deposit account field 546 or the control total amount field 552. The deposit details pane 606 displays information for the selected deposit. This data is updated with each step in the deposit process and each item added and corrected. If necessary, the account and control total amount, entered when the deposit was first created, can be changed from the capture view 600, correct view 602, and balance view 604. Data in the other fields of this pane 606 is automatically updated during the deposit process.

As items are scanned, item images, item details, and deposit details appear on the capture view 600. Front and back images 614, 616 of each item are created and presented correctly, regardless of item orientation when placed in the scanner. The user can add more checks to the scanner as needed. The image view pane 608 displays the current image being scanned or selected item in the grid of the item details pane 610. To pause or stop scanning, click a stop scanner button 618 at the bottom of the deposit wizard capture view 600. Once done scanning, the deposit wizard confirms that scanning is complete, the user is prompted to proceed to the Corrections view 602 of FIG. 9, such as by clicking a next button 620 or the user can select to scan additional documents or to save the work and return to the home view.

Image tools 622, 624 are provided respectively for a front view pane 626 and a back view pane 628 of the image viewer pane 608. Each image tools 622, 624 includes a zoom in icon, a zoom out icon, a reset image icon, an undo icon, and a redo icon for manipulating the active image 614, 616, respectively, in the view pane 626, 628.

In the grid of the capture view item details pane 610, information is provided about the active image, in particular an R/T Routing Transit number data field 630, an account deposit account number data field 632, an amount check item dollar amount data field 634, a serial number or check number data field 636, a tran code data field 638 that shows the check number, routing transit number, account number, or unique identifier depending on the check format, an item type data field 640 (e.g., marker, check, cash withdrawal, default, etc.), and a sequence number data field 642 assigned to the item.

With particular reference to FIG. 9, the correct view 602 of the Deposit Wizard allows for item detail corrections, replacing images, and removal of items from the current deposit.

Analysis and review of the image is accomplished by the Remote Deposit Capture software that presents the user with required fields to correct. The Analysis is a pass or failure of the Image Quality Analysis (IQA), Dream, Courtesy Amount Recognition/Legal Amount Recognition (CAR/LAR), or duplicate item review tests. Duplicates are identified using account, check, and routing transit numbers or other image correlation means. If all items scanned properly with no failed required fields, the next button on the Capture view will automatically advance the deposit to the Balance view 604 (FIG. 10).

If corrections or manual reviews are necessary, an image of the first item 614 requiring correction will be displayed in the image viewer pane (top) 608. Item analysis and required fields needing correction are shown in an item details (bottom) pane 644. Regarding the latter, an analysis sub-pane 646 displays results of recognition failures, quality assurance analysis, duplicate detection, etc. that need user attention. A required field(s) sub-pane 648 provides for user input of fields 650 needing to be manually input. A right-most sub-pane 652 provides a show grayscale button 654 to assist in manually discerning the information from the image 614, an accept button 656 to review and correct the next item, a replace image button 658 starts the scanner to re-scan the check item in view and replaces the original image. A remove button 660 removes the item completely from the deposit.

For items scanned conventionally as being duplicates, as items are captured, the MICR (magnetic ink character recognition) data of each item is checked against a history of items previously captured on the machine. If an item has been previously captured, it is flagged as a possible duplicate item. Three options are given for the suspect item: Accept, Remove, or Replace.

Various Image Quality Assurance (IQA) tests are performed on every item captured to ensure the usability and quality of the image in the deposit database prior to transmission. These IQA are classified into seven analysis categories given in Table 1. These tests are performed on the front and back image of each item separately.

TABLE 1

| CATEGORY | DESCRIPTION | QUALITY CHECK POINTS |
| --- | --- | --- |
| Image Format | Data layout of the image (Ex. Proper TIFF tags exist and are in proper order.) | • Image Format Error • Front Image Format Error • Back Image Format Error |
| Image Data Error | Compressed image data can be decompressed | • Front Image Data Error • Back |
| Image Density | Level of black pixel density | • Front Density Too High • Front Density Too Low • Back Density Too High • Back Density Too Low |
| Image Size Specifications | Expected dimensions of the image | • Front Image Too Narrow • Front Image Too Wide • Front Image Too Short • Front Image Too Tall • Front Image Data Too Small • Front Image Data Too Large • Back Image Too Narrow • Back Image Too Wide • Back Image Too Short • Back Image Too Tall |

TABLE 1-continued

| CATEGORY | DESCRIPTION | QUALITY CHECK POINTS |
| --- | --- | --- |
| Compressed Data Length Streaks | Size (in bytes) of compressed data "Stuck" pixels in the image which may result in display of horizontal bands | • Back Image Data Too Small • Back Image Data Too Large • Front Image Has Streaks • Back Image Has Streaks |
| Front/Back Width Ratio - Front/Back Height Ratio | Similar dimensions of front and back images | • Front Back Ratio Excessive |

In FIG. 10, the balance view 604 is provided for balancing the deposit so that the deposit items total (i.e., total amount on all items captured and corrected) and deposit control total (i.e., total expected amount of the deposit) must equal before submitting the deposit. When the totals equal, a virtual deposit ticket is automatically created, the deposit is prepared for submission, and prompt provided to send the submission. However, if these totals are not equal, additional steps will be necessary to balance the deposit and a balance adjustment—generate deposit ticket window (not shown) is presented. Any positive or negative difference to the expected deposit amount will be displayed in a difference box. Note the amount in the difference field and determine if the difference is from the deposit items total amount or from the deposit control total amount.

The balance view 604 includes a back button 670 that goes back to the correct view 602. A balance button 672 opens the balance adjustment—generate deposit ticket window or balance ready window.

Figure 11:
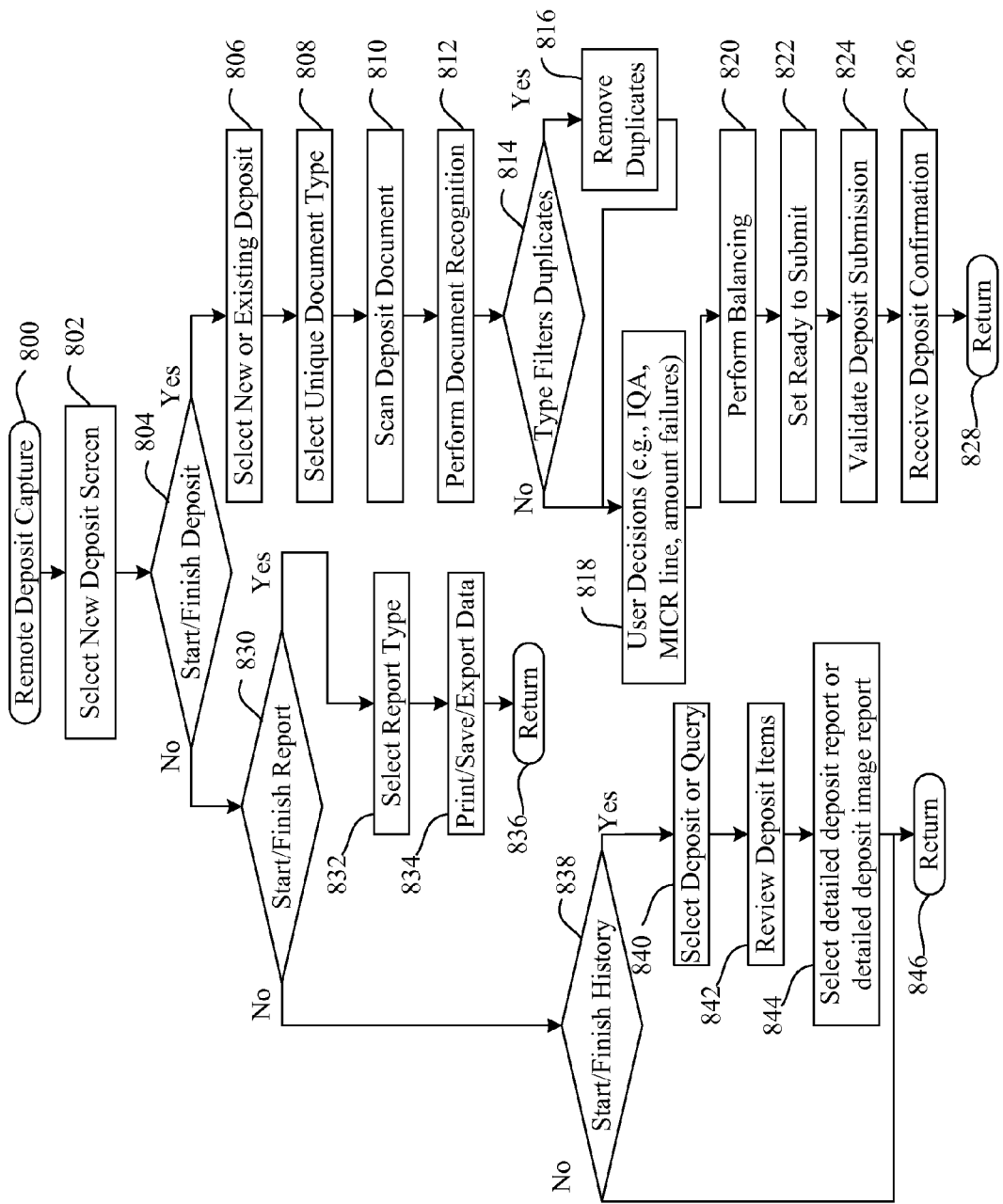
FIG. 11 illustrates a flow diagram of a methodology for remote deposit capture performed by the remote data capture system of FIG. 3.

In FIG. 11, a methodology 800 for remote deposit capture begins with selecting a new deposit screen in block 802. The user can select to start or finish a deposit in block 804. If so, in block 806 the user selects whether this is a new or an existing deposit. In block 808, the deposit can be designated of being of a unique document type that affects the automated recognition and quality assurance processing, such as for duplicate detection. Alternatively, the type of deposit can be automatically detected. In block 810, the deposit document is scanned. In block 814, a determination is made as to whether the selected/detected deposit type filters out duplicates. If so, in block 816 duplicates are removed. If not duplicate filter in block 814 or after duplicate removal in block 816, then the user may have to make decisions regarding IQA, MICR line, amount recognition failures, etc., in block 818. Then balancing is performed in block 820. The ready to submit input is set in block 822. The deposits are processed for validation of a deposit submission in block 824 by the receiving financial institution. A receive deposit confirmation is sent back in block 826 and the process returns in block 828. If back at block 804, the user does not select a deposit to process, then a further determination is made in block 830 as to whether the user selects to start or finish a deposit report. If so, a report type is selected in block 832, the report is printed, saved or data exported in block 834, and the process returns in block 836. If not selecting a report in block 830, then a further determination is made in block 838 as to whether a deposit history has been selected. If so, then a selection is made as to whether this history regards deposit or query in block 840. A review can be made of all deposit items in block 842. Then a selection can be made in block 844 for a detailed deposit report or a detailed deposit image report. Then processing returns in block 846.

Figure 12:
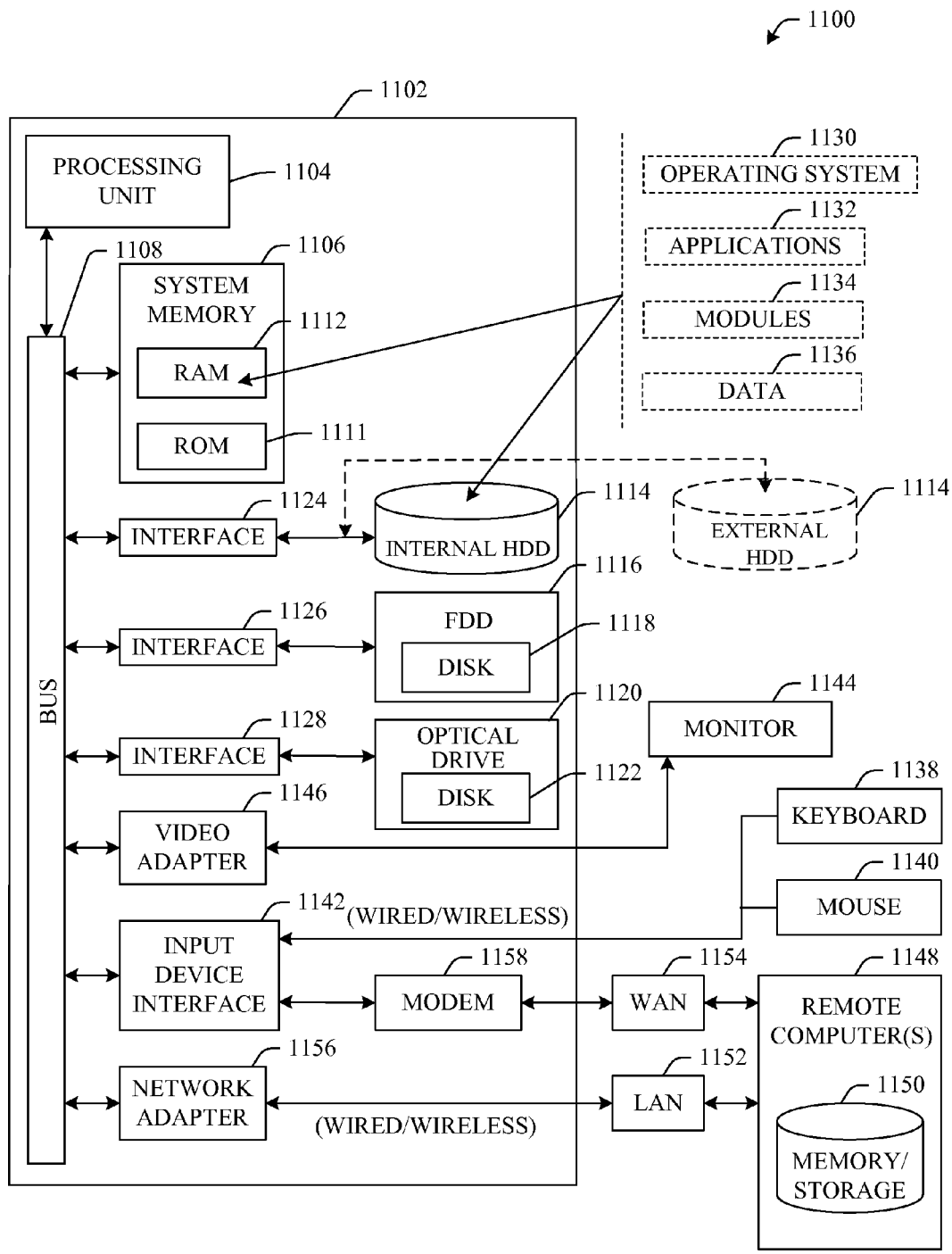
FIG. 12 illustrates a brief general description of a suitable computing environment wherein the various aspects of the subject innovation can be implemented.

Referring now to FIG. 12, there is illustrated a block diagram of a computer operable to execute the disclosed architecture. In order to provide additional context for various aspects of the subject innovation, FIG. 12 and the following discussion are intended to provide a brief, general description of a suitable computing environment 1100 in which the various aspects of the innovation can be implemented. While the innovation has been described above in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1100 for implementing various aspects of the innovation includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the innovation.

A number of program modules can be stored in the drives and RAM 912, including an operating system 1130, one or more application programs 1132, other program modules 1134 and program data 1136. All or portions of the operating system, applications, modules, and/or data can also be cached in the RAM 1112. It is appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
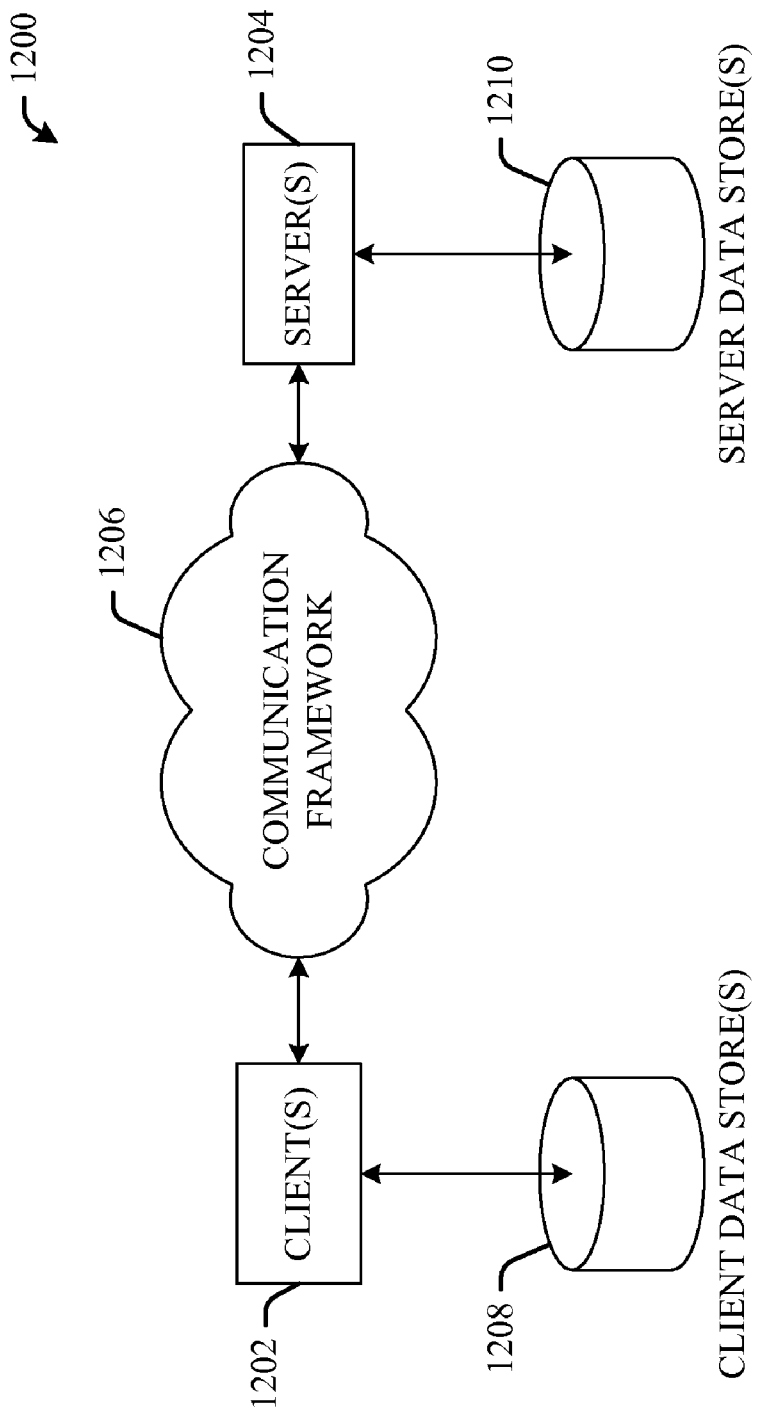
FIG. 13 illustrates a schematic diagram of a client-server computing environment wherein the various aspects of the subject innovation can be implemented.

Referring now to FIG. 13, there is illustrated a schematic block diagram of an exemplary computing environment 1200 in accordance with the subject innovation. The system 1200 includes one or more client(s) 1202. The client(s) 1202 can be hardware and/or software (e.g., threads, processes, computing devices). The client(s) 1202 can house cookie(s) and/or associated contextual information by employing the innovation, for example.

The system 1200 also includes one or more server(s) 1204. The server(s) 1204 can also be hardware and/or software (e.g., threads, processes, computing devices). The servers 1204 can house threads to perform transformations by employing the innovation, for example. One possible communication between a client 1202 and a server 1204 can be in the form of a data packet adapted to be transmitted between two or more computer processes. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for electronic processing of deposit documents, comprising:

imaging a deposit document having a financial institution code line;

determining a deposit type of the imaged deposit document of a plurality of deposit types including at least a first deposit type from a financial institution utilizing a unique financial institution code line per deposit document and a second deposit type from a non-financial institution utilizing a non-unique financial institution code line per deposit document;

performing duplicate detection on the plurality of deposit types;

in response to determining the first deposit type from the financial institution, removing a duplicate document when more than one deposit documents having the same unique financial institution code lines are detected;

in response to determining the second deposit type from the non-financial institution, allowing duplicate documents based on detecting more than one deposit document having the same non-unique financial institution code; and storing a result of the duplicate detection in a non-transitory computer-readable storage medium.

2. The method of claim 1, further comprising determining the first deposit type comprising a check or a cash withdrawal, and determining the second deposit type comprising a casino marker.

3. The method of claim 1, further comprising recognizing a magnetic ink character recognition (MICR) code line as comprising either the unique financial institution code or the non-unique financial institution code.

4. The method of claim 3, further comprising performing duplicate detection for the first deposit type by determining uniqueness of the MICR code line.

5. The method of claim 1, further comprising flagging a serial number associated with the imaged deposit document to annotate a detected duplicate for later processing.

6. The method of claim 1, further comprising performing duplicate detection for the second deposit type by determining whether a threshold has been exceeded for an image correlation between imaged deposit documents in lieu of the non-unique financial institution code.

7. The method of claim 1, further comprising:
recognizing transaction data associated with the imaged deposit document; and
indicating detection of a duplicate in a serial number field of the transaction data.

8. The method of claim 1, further comprising determining the deposit type of the imaged deposit document by recognizing a type code imprinted on the deposit document.

9. The method of claim 1, further comprising determining the deposit type of the imaged deposit document by receiving a user input on a user interface.

10. The method of claim 9, further comprising correcting:
recognizing transaction data associated with the imaged deposit document;
receiving a correction input via a user interface to the recognized transaction data; and
storing an audit report containing the correction input.

11. The method of claim 10, further comprising receiving the correction input of an opt out command for duplicate detection.

12. The method of claim 10, further comprising receiving the correction input of an amount change.

13. The method of claim 10, wherein further comprising receiving the correction input of an imaging quality assurance override.

14. An apparatus for electronic processing of deposit documents, comprising:
a scanner for imaging a deposit document having a financial institution code line;
a processor for determining a deposit type of the imaged deposit document of a plurality of deposit types including at least a first deposit type from a financial institution utilizing a unique financial institution code line per deposit document and a second deposit type from a non-financial institution utilizing a non-unique financial institution code line per deposit document; and
a duplicate detection component for detecting duplicate imaged deposit documents,
wherein a duplicate document is removed when more than one deposit documents of the first deposit type from the financial institution having the same unique financial institution code line is detected,
wherein a duplicate document is allowed when more than one deposit documents of the second deposit type from the non-financial institution having the same non-unique financial institution code in response to determining the second deposit type is detected.

15. The apparatus of claim 14, further comprising the processor determining the first deposit type comprising a check or a cash withdrawal, and determining the second deposit type comprising a casino marker.

16. The apparatus of claim 14, further comprising the processor recognizing a magnetic ink character recognition (MICR) code line as comprising either the unique financial institution code or the non-unique financial institution code.

17. The apparatus of claim 16, further comprising the processor performing duplicate detection for the first deposit type by determining uniqueness of the MICR code line.

18. The apparatus of claim 14, further comprising the processor flagging a serial number associated with the imaged deposit document to annotate a detected duplicate for later processing.

19. The apparatus of claim 14, further comprising the processor performing duplicate detection for the second deposit type by determining whether a threshold has been exceeded for an image correlation between imaged deposit documents in lieu of the non-unique financial institution code.

20. The apparatus of claim 14, further comprising the processor recognizing transaction data associated with the imaged deposit document, and indicating detection of a duplicate in a serial number field of the transaction data.

21. The apparatus of claim 14, further comprising the processor determining the deposit type of the imaged deposit document by recognizing a type code imprinted on the deposit document.

22. The apparatus of claim 14, further comprising: a user interface; and the processor determining the deposit type of the imaged deposit document by receiving a user input on a user interface.

23. The apparatus of claim 22, further comprising an audit reporting component containing a correction input received by the user interface, wherein the processor corrects recognized transaction data associated with the imaged deposit document in accordance with the correction input.

24. The apparatus of claim 23, further comprising the user input receiving one of a group consisting an opt out command for duplicate detection, an amount change, and an imaging quality assurance override.

25. An apparatus for electronic processing of deposit documents, comprising:
means for imaging a deposit document having a financial institution code line;
means for determining a deposit type of the imaged deposit document of a plurality of deposit types including at least a first deposit type from a financial institution utilizing a unique financial institution code line per deposit document and a second deposit type from a non-financial institution utilizing a non-unique financial institution code line per deposit document;
means for detecting duplicate documents of the imaged deposit document of the plurality of deposit types;
means for, in response to determining the first deposit type, removing a duplicate document when more than one deposit documents having the same unique financial institution code line; and
means for, in response to determining the second deposit type, allowing duplicate documents based on detecting more than one deposit document having the same non-unique financial institution code.

* * * * *